United States Patent [19]

Popovich et al.

[11] Patent Number: 4,981,543

[45] Date of Patent: Jan. 1, 1991

[54] TUB APPARATUS

[75] Inventors: John M. Popovich, Los Angeles; Roc V. Fleishman, Venice, both of Calif.

[73] Assignee: Softub, Inc., Pacoima, Calif.

[21] Appl. No.: 345,894

[22] Filed: May 1, 1989

Related U.S. Application Data

[63] Continuation-in-part of Ser. No. 145,233, Jan. 19, 1988, Pat. No. 4,858,254, which is a continuation-in-part of Ser. No. 891,232, Jul. 30, 1986, Pat. No. 4,843,659.

[51] Int. Cl.$^5$ .......................... B31C 9/00; B65H 81/06
[52] U.S. Cl. ..................................... 156/191; 156/193
[58] Field of Search ............... 156/184, 186, 191, 192, 156/195, 193, 194; 4/542, 544, 584; 220/421

[56] References Cited

U.S. PATENT DOCUMENTS

| | | | |
|---|---|---|---|
| 3,300,355 | 1/1967 | Adams | 156/189 |
| 3,337,384 | 8/1967 | Wright | 156/180 |
| 3,923,573 | 12/1975 | Hay | 156/186 X |
| 4,118,814 | 10/1978 | Holtom | 156/191 X |
| 4,579,617 | 4/1986 | Oberg | 156/184 |

*Primary Examiner*—Michael L. Lewis
*Attorney, Agent, or Firm*—William W. Haefliger

[57] ABSTRACT

Tub apparatus includes a foamed resiliently compressible plastic tub wall having an inner side and an outer side, the tub having an interior to receive liquid; a tensile liner adjacent the wall side, the liner and characterized in that it resists outward expansion in response to loading exerted by liquid filled into the tub interior; and including ports extending through the side wall and liner for circulating liquid between the interior of the tub and the exterior thereof. The plastic wall is typically locally heat cored in situ and provided with elbow fittings having venturis for efficient water, and water and air flow.

22 Claims, 8 Drawing Sheets

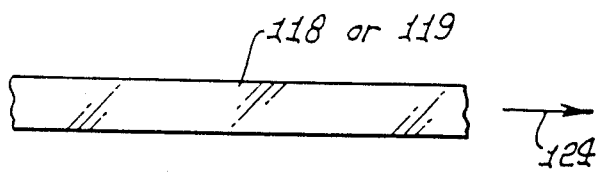
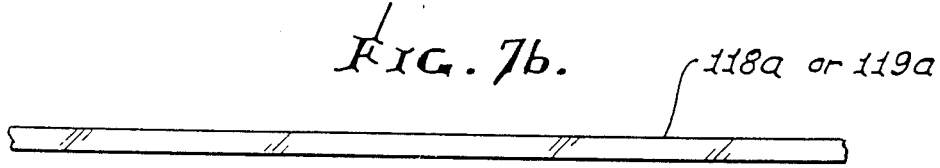
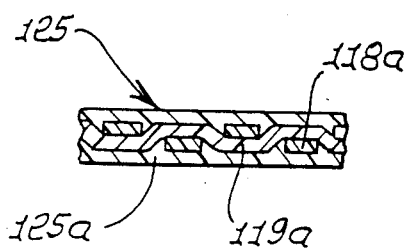
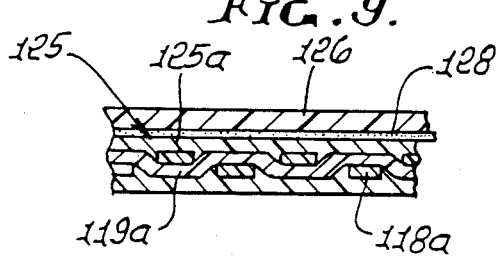
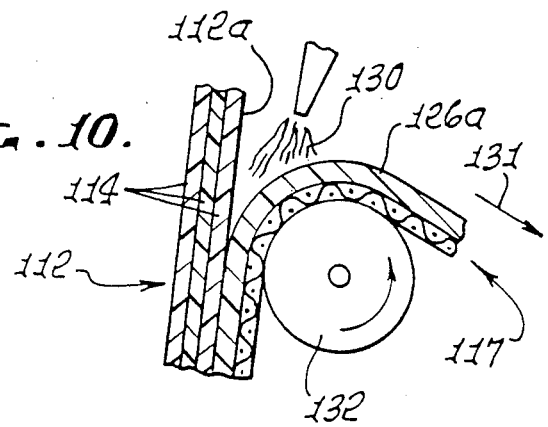
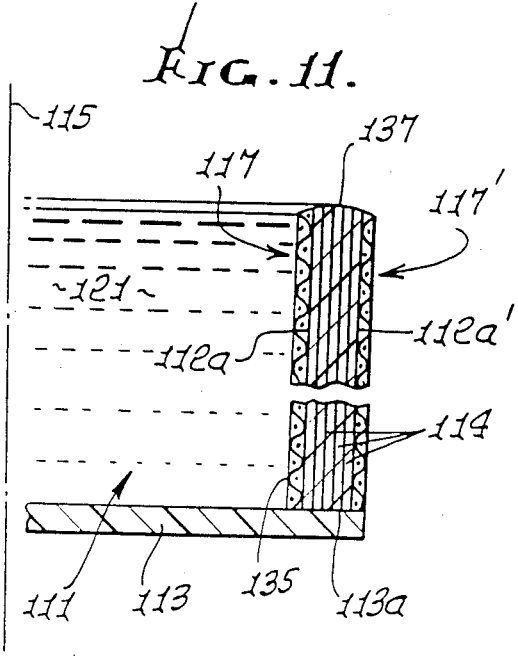
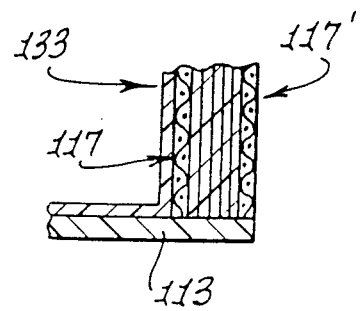

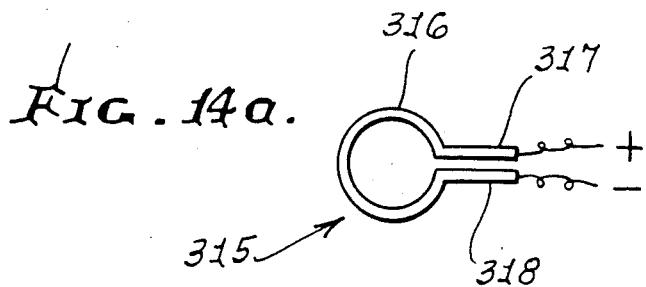
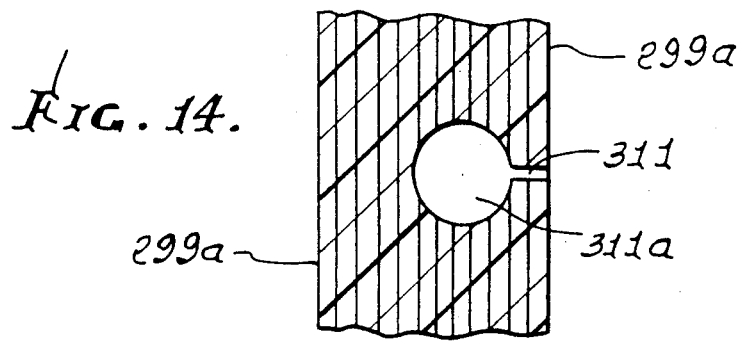
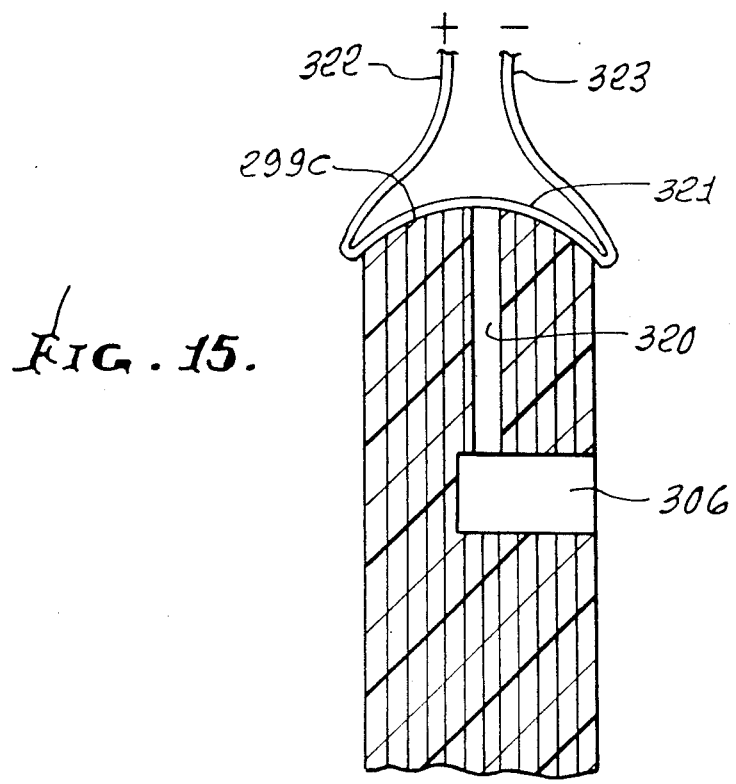

TUB APPARATUS

This application is a continuation-in-part of Ser. No. 145,233, filed Jan. 19, 1988, now U.S. Pat. No. 4,858,254 which is a continuation-in-part of Ser. No. 891,232, filed July 30, 1986 now U.S. Pat. No. 4,843,659.

BACKGROUND OF THE INVENTION

This invention relates generally to hot tubs or spas, and more particularly to a low-cost, light-weight, insulated, semi-rigid plastic spa, which is easily portable, and hot water supply means therefor.

Conventional hot tubs are heavy, non-portable, and expensive in their construction; also, excessive electrical and heat energy is required for their operation. There is need for a greatly improved spa structure with the unusual advantages in construction, modes of operation, use and transport, and results, as are now made possible by the present invention, as will appear.

SUMMARY OF THE INVENTION

It is a major object of the invention to provide a hot tub or spa meeting the above needs. Basically, the inexpensive, light-weight tub apparatus comprises:

(a) a foamed plastic wall having an inner side and an outer side, the tub having an interior to receive liquid, (b) a tensile liner adjacent the wall side, the liner and characterized in that it resists outward expansion in response to loading exerted by liquid filled into the tub interior, (c) and including ports extending through the side wall and liner for circulating liquid between the interior of the tub and the exterior thereof.

It is a further object to provide a non-stretchable flexible liner that includes a plastic foam layer bonded to the interwoven strips and also to the wall inner side. As will be seen, the plastic strips may consist of pre-stretched polyethylene, and the mesh formed by the interwoven strips is typically embedded with a plastic coating to prevent leakage of liquid through the liner.

If the liner is applied to the inner side of the tub wall, a similar liner may also be applied to the outer surface of the wall defined by the spiral wound layers, to resist wall expansion, and a plastic jacket may be applied over the composite wall, as thus formed. Other objects are to provide tubular fitting aeration tubes and water flow ducts installed into the wall via cored passages and slits extending along side such passages, as well as heat cut ports, all in the tube wall.

The method of constructing the tub apparatus basically includes:

(a) winding the wall sheet in a spiral to form spiral convolutions and progressively bonding together the spiral convolutions during the winding, thereby to form an upstanding tub wall having an inner side and outer side, and a tub interior, (b) bonding a liner to the wall inner side to resist outward expansion toward the wall in response to loading exerted by liquid filled into the tub interior, (c) and slitting the tub wall, and coring the wall to enable insertion of tubular fitting and plastic ducting for supply of water to and drainage of water from the tub interior.

Bonding is typically affected by heating the side of the liner to tacky state, and pressing the heated side of the liner against the side of the tub wall. The liner also typically includes a plastic foam layer bonded to the interwoven strips, and the heating heats a surface of the plastic foam layer to tacky state; and a roller it typically employed to progressively press the liner toward the wall, and the liner is fed about the roller to present the surface of the foam layer away from the roller for heating.

These and other objects and advantages of the invention, as well as the details of an illustrative embodiment, will be more fully understood from the following specification and drawings, in which:

DRAWING DESCRIPTION

FIGS. 7a and 7b show plastic strips;

FIG. 8 shows a mesh formed by interwoven strips, and coated with plastic;

FIG. 9 shows a completed liner;

FIG. 10 shows bonding of a liner to the tub wall;

FIG. 11 shows a completed tub with lining or linings applied; and

FIG. 11a is a fragmentary view showing a jacket applied;

FIG. 14 is a vertical section showing coring of the FIG. 13 tub portion, via the formed slit;

FIG. 14a is an end view of a coring tool;

FIG. 15 is a vertical section showing the location of a vertical air passage formed in the tub wall to intersect a cored passage, and forming of the convex top rim of the wall;

DETAILED DESCRIPTION

Figure 1:
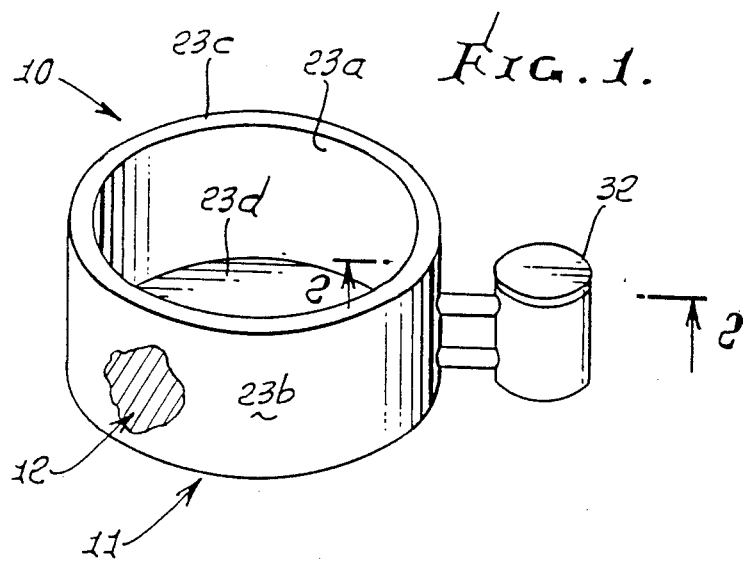
FIG. 1 is a perspective view of spa equipment embodying the invention.
Figure 2:
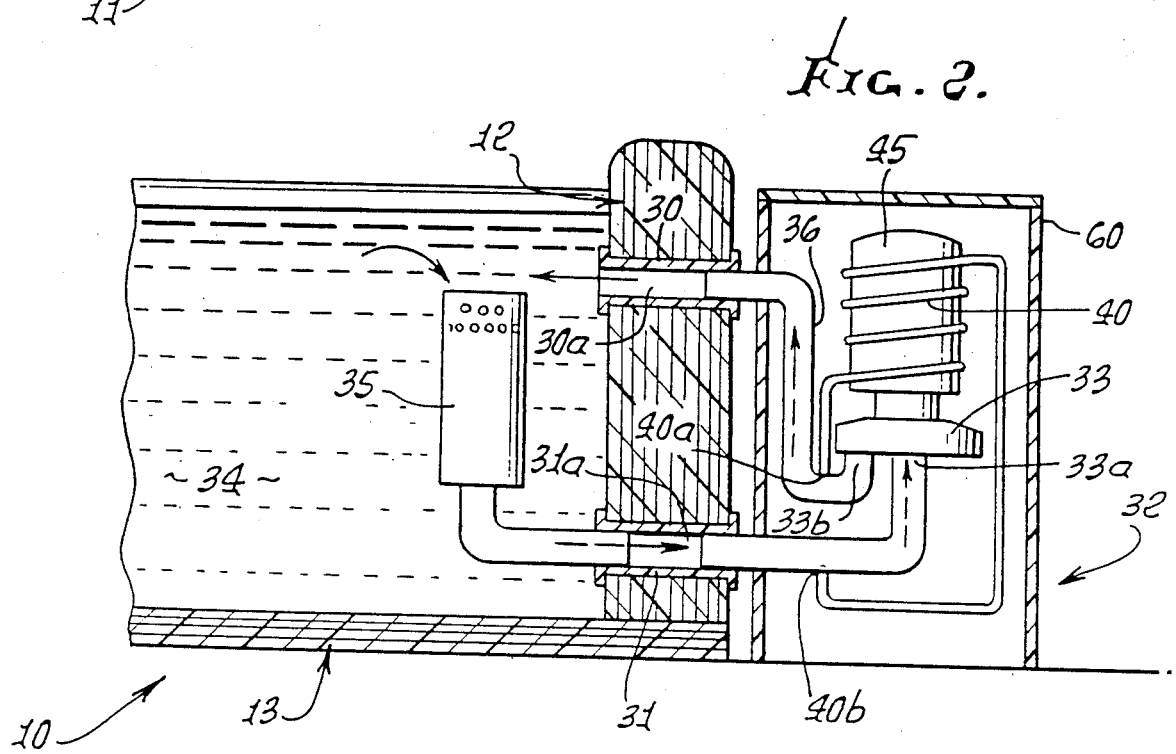
FIG. 2 is an enlarged section on lines 2—2 of FIG. 1.
Figure 3:
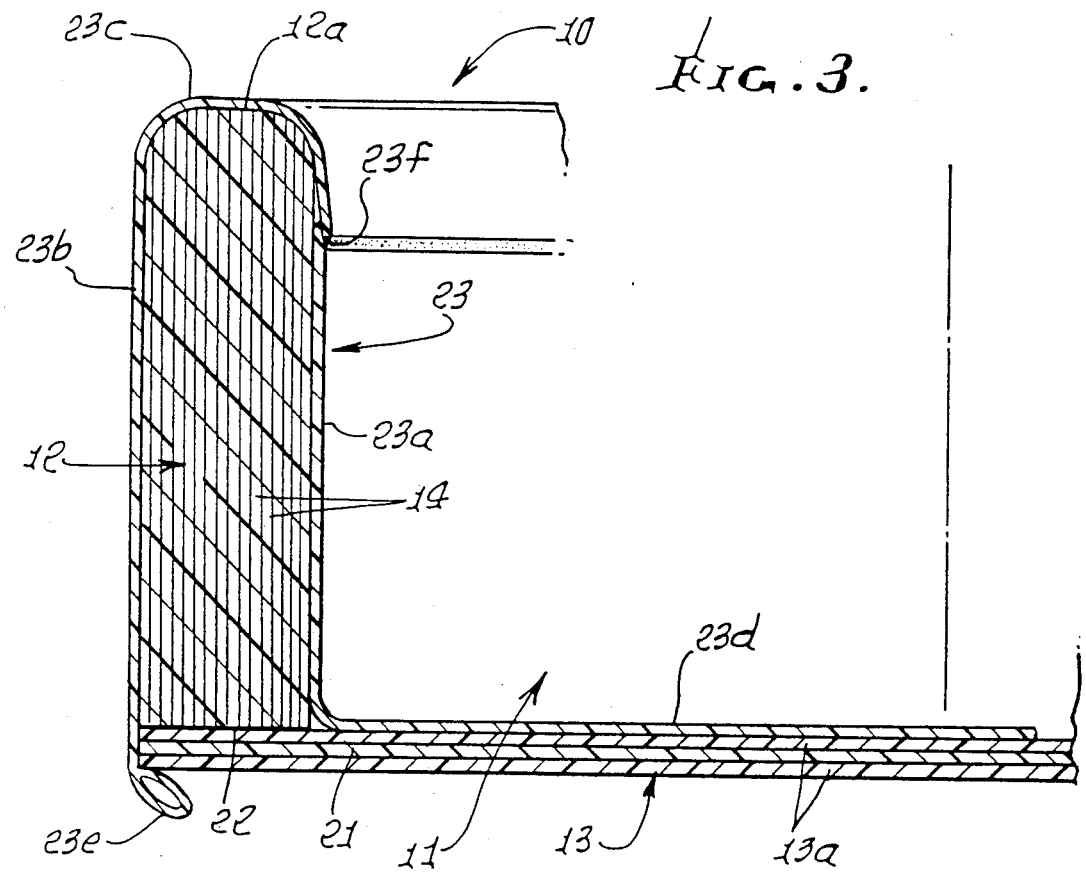
FIG. 3 is an enlarged section showing construction of the spa side wall and bottom wall.
Figure 6:
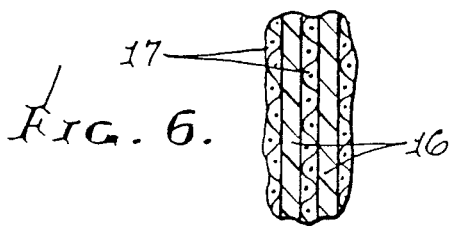
FIGS. 6 and 6a are enlarged views showing tub wall structure.
Figure 6A:
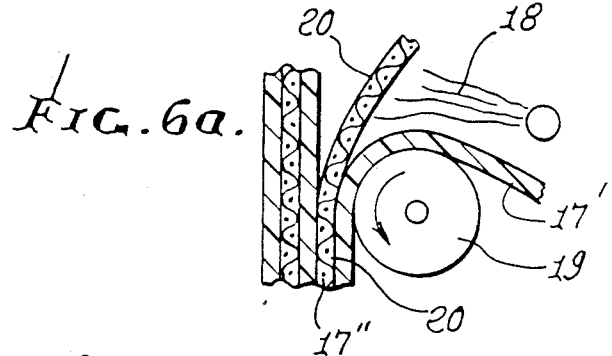

In FIGS. 1–3, the apparatus 10 includes a tub 11 having an insulative, annular side wall 12, and a bottom wall 13 attached to side wall. The side wall comprises a foamed plastic sheet or sheets 14 wound in a spiral about the tub axis 15, to form multiple layers. As is clear from FIGS. 2 and 3 the sheet is maintained to have width approximating the height of the side wall 12, during such winding, the layer having approximately the same width (height in FIGS. 2 and 3). The latter are better indicated at 16 in FIG. 6, with glass fiber reinforcement screen material 17 optimally fitted between the foamed plastic layers 16. Such layers may typically consist of polyethylene foam of between ⅛ and ⅜ inch thickness, as for example, about ¼ inch thickness; and, if used, the glass fiber screen may define about ½ inch square open spaces between woof strands and between warp strands. The polyethylene layers are rapidly joined together as by engagement of the outermost layer, during spiral winding, with a heating flame 18 and a roller 19, as seen in FIG. 6a. The pressure roller presses the heated inner surface of the outermost layer 17' against the flame heated outer surface of the next inner layer 17" to establish fusion contact, as for example through the spaces between warp strands 20, and also between woof strands extending at 90° to strands 20. Thus, an integral relatively stiff and very sturdy spiral fusion laminated light-weight side wall 12 is gradually formed during the spiral winding process; and a person may sit comfortably on the top edge or rim 12a of the wall 12 without damaging it or the tub construction.

The tub bottom wall 13 has a similar construction except that parallel sheets 13a (⅜ inch thick) of cross linked polyethylene foam, with or without glass fiber layers 12 therebetween, are heated fusion welded to form an integral bottom wall. The latter is then peripherally fusion welded as at 22 to the bottom of the side wall. A plastic jacket 23 may be fitted about both the side wall and bottom wall. Jacket 23 sheets may consist of foamed, reinforced, marine vinyl resin; and include inner sheet 23a, outer sheet 23b, crest sheet 23c, and bottom sheet 23d, all joined together to form an internal waterproof decorative jacket, as shown. Jacket lower edge extend may be looped as at 23e, and a draw string fitted in the loop to be drawn tight and attach the jacket to the wall 12. A welded seam is indicated at 23f. The vinyl jacket may have selected weatherable color.

Figure 4:
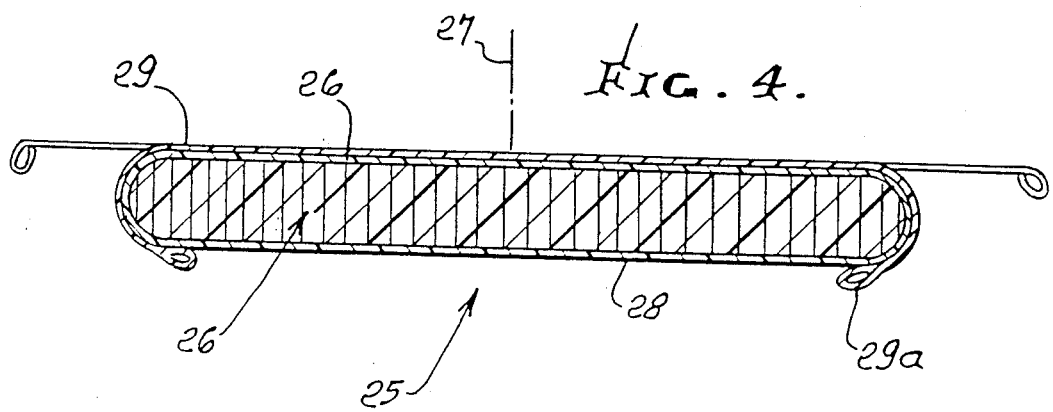
FIG. 4 is an enlarged section showing interior construction of the spa unit cover.

A tub cover is shown at 25 in FIG. 4, with generally the same spiral polyethylene layer construction, as does wall 12. Thus, spiral polyethylene layer or layers 26 extending about vertical axis 27 can be fusion welded together, similar to the wall section but typically without the fibers. Additional structural stiffness may be imparted to the cover by creating thermally densified layers on each face, 26 and 28. These are created by compressing the spiral wound structure between two hot plattens. A vinyl jacket 29 is fitted about the polyethylene windings, and is held in place by a draw string in loop 29a.

FIG. 2 shows upper and lower ports formed through the tub wall as by tubular plastic fittings 30 and 31. Water circulating means 32 is connected with those ports, and includes a pump 33 for circulating water into the tub interior 34 via upper port 30a, and for withdrawing water from the tub interior 34 as via lower port 31a. A filter 35 is located within the tub to filter the water being withdrawn through port 31a, so that dirt and small objects are not fed to the pump lower inlet 33a. The filter is easily withdrawn upwardly at the tub interior, for cleaning or replacement. The pump discharges sidewardly at outlet 33b, and plastic piping extends upwardly at 36 to deliver pressurized and heated water to port 30a, and an associated venturi.

The water circulating mean includes an electric motor connected in driving relation with the pump, and includes a shunt duct connected with the water circulating mean and located to receive heat generated by operation of the motor to heat a side stream of the water passing through the shunt duct. The illustrated shunt duct includes metallic tube 40 wound about the pump drive motor 45 to receive heat from same, for heating the tub water, whereby extreme simplicity and energy savings are realized. The duct 40 has an end connected at 40a into the water circulating system proximate pump outlet, i.e. into piping upper branch 36; its opposite end connected as at 40b into the water circulation system proximate pump inlet 33a, i.e. in lower piping branch 43 extending from port 31a to inlet 33a. Accordingly, water flows in the shunt duct from a higher (pressurized) level to a lower level; and a portion of the water flowing through the pump is heated and reheated, for highly efficient heating action. Thus, no external source of heat for the hot-tub water is required, and motor 45 serves multiple functions, its waste heat being efficiently utilized. The height of the inlet and outlet of the shunt duct are approximately the same to minimize thermosyphon action when the motor is off. The thermosyphon action can cause a momentary surge of extra hot water to trip the high limit switch 49.

Figure 5:
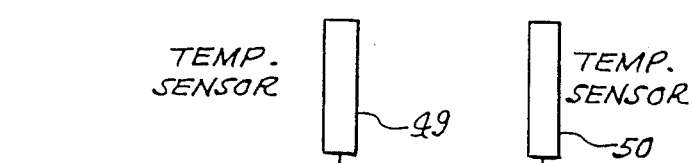
FIG. 5 is a wiring diagram.

In the schematic of FIG. 5, the motor coil 45a is supplied with electrical energy from a plug 46, such as is insertible into a household 120 volt outlet coil includes line 47 with which thermostat switch 48, and high limit switch 49 are connected in series. Switch 48 is operated by a thermostat sensor 49 applied to inlet port 30a, whereby if the water is too hot, the motor is shut down. Limit switch 49 is also controlled by temperature sensor 50 located adjacent the tub to shut the motor down if the tub becomes overheated. Line 47 and return line 47a pass through cord 52, and through a ground fault interruptor 53, as shown.

A plastic shell enclosure or housing for the pump and motor is indicated at 60. It is well insulated to keep the heat generated by the motor inside where it can be transmitted to the water, and to minimize sound from the motor and pump inside for the comfort of the users. It is a compact package which facilitates ease of transport and set-up of same.

In FIG. 11 the tub apparatus 111 includes an insulative, bottom wall 113 supporting the side wall, as by attachment to the lowermost extent thereof, at 113a. The side wall comprises a foamed plastic sheet or sheets 114 wound in a spiral about tub axis 115, to form multiple layers. Such layers may typically consist of polyethylene foam of between ⅛ and ⅜ inch thickness, as for example about ¼ inch thickness. The layers are rapidly joined together as by engagement of the outermost layer, during spiral winding, with a heating flame, as described above in connection with FIG. 6a; however, no glass fiber screen is employed.

Instead, an inner liner 117 is provided adjacent the wall inner side 112a. As indicated in FIG. 9, that liner comprises interwoven strips 118a and 119a of pre-stretchable plastic material characterized in that the liner resists outward expansion toward wall 112 in response to loading exerted by liquid such as water 121 in the tub interior See FIG. 11. Therefore, the tub wall 112 is not deflected or stretched radially outward, as it would be in the absence of the liner.

FIG. 7a shows a typical thermoplastic (such as polyethylene) strip 118 or 119 prior to pre-stretching, endwise, in the direction of arrows 123 and 124. FIG. 7b shows the same strip 118a or 119a after such stretching, with a correspondingly reduced width, to provide high tensile strength. FIG. 8 shows the strips 118a and 119a closely interwoven with warp 118a and woof 119a strand or strip layer or mesh pattern 125. The woven strips are then embedded in or coated with a plastic coating 125a to prevent leakage of liquid therethrough and to provide load spreading. The plastic coating may also consist of polyethylene. Such a mesh is a product of Chave and Early, New York, New York, and sold under the name "CE-TEX".

FIG. 9 shows the completed liner 117, which includes a plastic foam layer 126 bonded in face-to-face relation with one side of the coating layer 125a. The layer 126 may for example consist of polyethylene foam. The bond interface is indicated at 128, and may be formed by heat fusion.

As a result, the composite liner 117 may be fusion bonded to the inner side 112a of the spiral layer wall 112. FIG. 10 shows that process. Bonding is carried out by heating the outer side 126a of the layer and/or the side 112a, to tacky state, and then pressing the hot tacky side 126a against the side 112a of spiral layer wall 112. Liner 117 extends more than 360° around the tub, to provide overlap. Heating is effected by directing flame 130 or other heat source heat against sides 126a and/or side 112a, as seen in FIG. 10, and as the liner is progressively fed in direction 131, a pressure roller 132 rolling against the applied liner to press side 126a against side 112a.

FIG. 11 also shows a like liner 117' applied against the outer side 112a' of the wall 112, to also resist outward stretching of the wall 112 and also to add toughness. Finally, a jacket 133 like jacket 123 may be applied or attached to the inner surface 135 of the completed tub wall and to tub bottom wall 113, or to the liner 117. See FIG. 11a, the jacket applied in the same manner as in FIG. 3. A tub wall upper rim appears at 137, in FIG. 11. Jackets 123 and 133 may have the same construction as tensile liner 117.

In the above FIGS. 10, 11 and 11a, the lined tub wall indicated by layers 114 may instead be a single layer of foam.

From the foregoing it will be understood that the primary purpose of the tensile band or liner 117 is to absorb the hoop stress caused by the pressure resulting from the column of water in the tub. Without such tensile band, the water pressure places continuous compression and tensile stresses o the inner side of the tub wall. The polyethylene foam walls or layers 114 expand, especially at the bottom, in the absence of tensile band 117. That band also provides improved wall toughness and reduced communication of fluids between tub walls and outside environment.

A like tensile band in the wall between the inner and outer sides of the wall may be employed to absorb hoop stress while allowing some compression and compliance of foam inside tensile band. One such layer, as seen in FIG. 11, may be considered to represent such an intermediate band.

An O.D. tensile band as at 117' is usable to absorb loads from people sitting on the tub wall, improve O.D. toughness, improve aesthetics, and reduce communication of fluids between tub walls and environment.

Liner materials or composites may be constructed to have enough tensile strength to act as tensile band. Typically materials include vinyl film or films laminated to polyester fabrics and polyester fabrics coated with vinyls. Unattached and/or attached tensile band materials include metal foil, glass fibre reinforced polymers, aluminum sheet, coated and uncoated polyester fabrics films laminated to polyester fabrics, spun bonded polyester fibres, tensilized polyester films, and tensilized polyethylene films slit to thin strips and woven in two axes and coated with polyethylene as described herein. Thin layers of PE/EVA, PE, EVA, XLPE, and/or PVC foam may be attached to the inside of the tensile band to reduce water transport, improve aesthetics and/or feel, from inside the tub, to act as a tie layer, and to act as a compression element for plumbing seals.

Fibre or filament molecular orientation is preferably generally circumferential; however, biaxial and random orientation are also possible.

Tensile band or bands may be attached to a liner for a tub wall inner surface, as via adhesive, solvents, and/or thermal fusion techniques including radio frequency heat sealing and ultrasonic welding. Tie layers may be used to make material attachment easier, via improved bonding compatability, to add stiffness, to reduce leakage, and/or improve aesthetics and feel.

Intermediate tensile bands (between I.D and O.D.) may use the above-described materials, or glass fibers and polymer fibers in loose, uni-directional and bi-directional fabrics, fused between layers of polyethylene foam during wall construction. Outer side tensile bands may be fastened using above methods, or by shrinking on the tub outer wall.

Tensile band material candidates are typically available as rolls and must be overlapped to create a circumferential tensile band. Although tensile bands spirally wound into the tub wall may be overlapped without direct connection, I.D. and O.D. tensile bands typically require joining as via solvents, adhesives, mechanical fasteners and/or thermal fusion techniques.

A tensile band acting as liner, or attached to a liner, may be provided to add stiffness to the liner and thereby ease fitting to the inside of the tub. Additionally, this configuration toughens the liner and may be used along with a foam layer as a mechanical plumbing seal.

Figure 12:
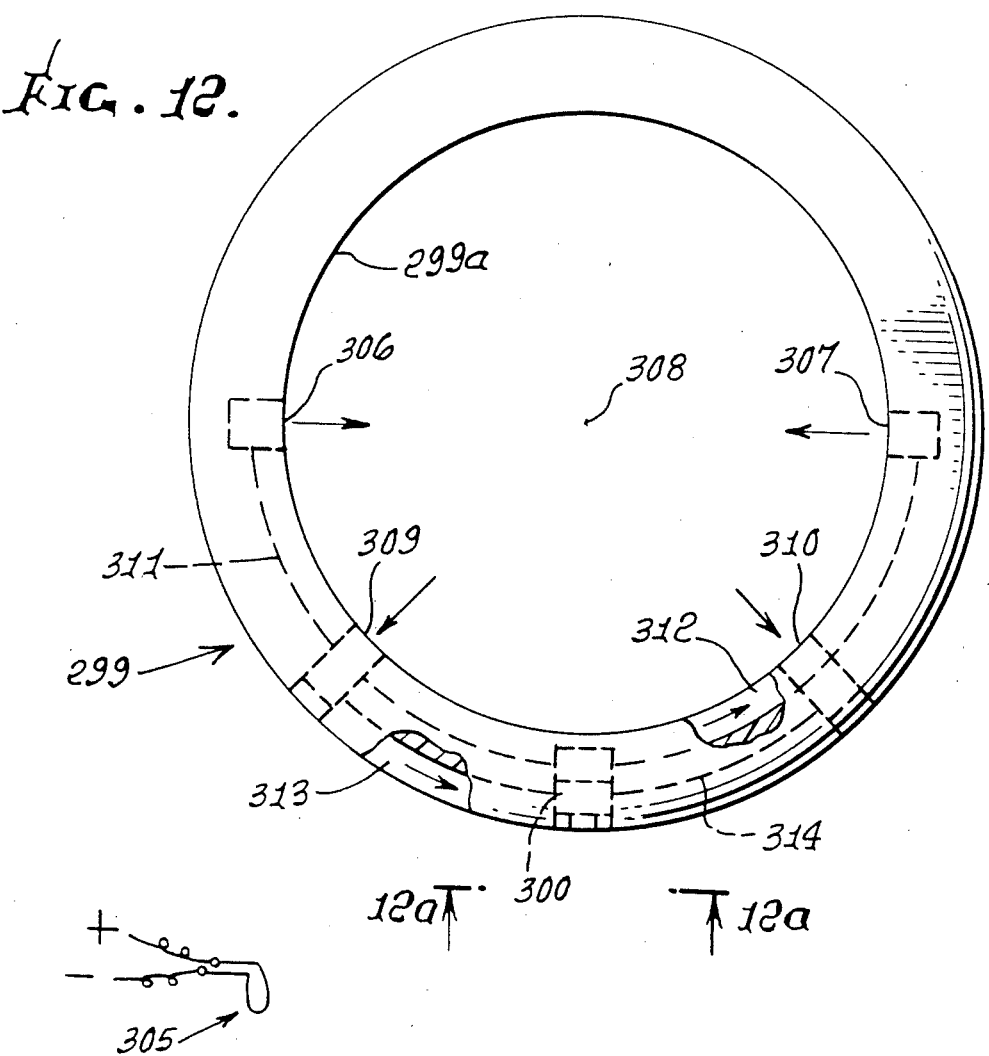
FIG. 12 is a plan view of a spa tub showing port location.
Figure 12A:
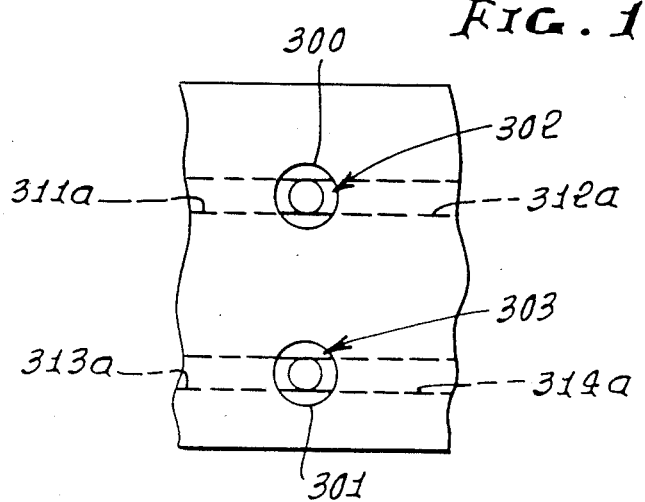
FIG. 12a is a plan view of a spa tub showing port location.
Figure 13:
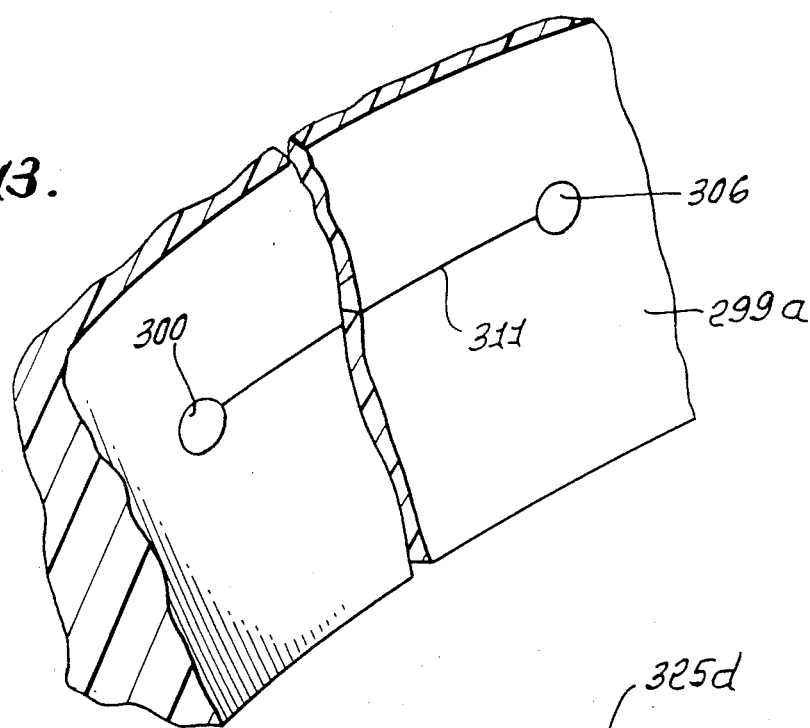
FIG. 13 is a perspective view of a portion of a tub, showing slit forming between port location.

Referring now the modified tub of FIG. 12, it shows the locations of ports in the tub wall 299 as during construction of the tub, following forming of the spiral layer wall, as described above. Inlet and outlet ports are shown at 300 and 301, with T-shaped tubular fittings 302 and 303 in those ports. The ports extend only part way into the tub wall, from the outer side thereof, and are formed as by use of electrically heated circular wire or knife 305 applied to the wall, in a radial direction. The drain port 301 is below and lower than the inlet port 300, as shown in FIG. 12a.

Also shown are the location of two jet inlet ports 306 and 307 formed radially outwardly from the inner side 299a of the tub wall, and at 180° spacing about the tub axis 308. Two outlet ports 309 and 310 are also formed radially outwardly from the inner side 299a of the tub wall, and at about 90° spacings about axis 308.

Next, slits are cut into the tub wall, including slits 311 and 312 respectively between inlet 300 and the jet ports 306 and 307, and slits 313 and 314 respectively between the drain port 301 and the outlet ports 309 and 310. Slits 311 and 312 may be cut into and from the inner side of wall 299a, at the level of port 300 and slits 313 and 314 may be cut into and from the outer side of the wall, at the level of port 301. The slits are cut to depths allowing insertion of a coring tool 315 (see FIG. 14a) into port 300 for example, and then travel of the tool circumferentially into alignment with first port 306, and the port 302. The tool 315 has an electrically heated circular metal band 316, that cores the passages 311a and 312a associated with slits 311 and 312, with electrical leads 317 and 318 that mount band 316 and pass radially through and along the slit (311 or 312) as the tool is moved circumferentially. Heating of the band is to temperatures that melt the thermoplastic of the wall, in situ, as the band is advanced, after the wall is coil-formed. The severed tubular core pieces are then pulled out through the slits. In similar manner, passages 313a and 314a associated with slits 313 and 314 are formed by tool 315. Note that the formed passages extend through adjacent layers of the wound plastic wall.

Next, aeration passages 320 are formed vertically above the injection ports 306 and 307, as seen in FIG. 15. Also, the top rim of the wall is shaped to be convex upwardly. FIG. 15 shows an electrically heated, curved cutter band 321 being advanced lengthwise (normal to the plane of FIG. 15) around the tub rim to sever material above the band. Note electrical leads 322 and 323.

Figure 16:
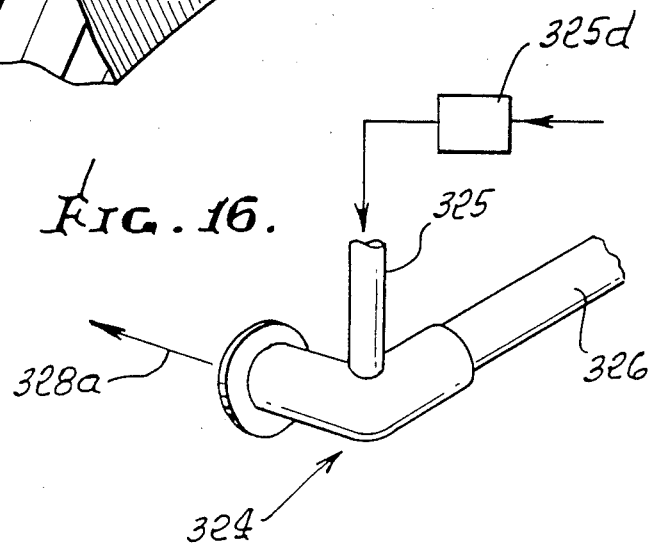
FIG. 16 is a perspective view of a tubular elbow, with attached vertical pipe, and horizontal ducting, to be inserted into the cored passage, via the formed slit.
Figure 16A:
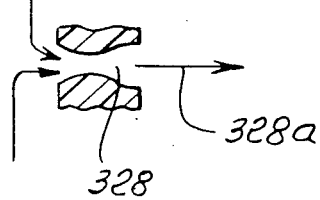
FIG. 16a is a horizontal section showing the FIG. 16 elbow in installed (inserted) position in the tub wall.
Figure 22:
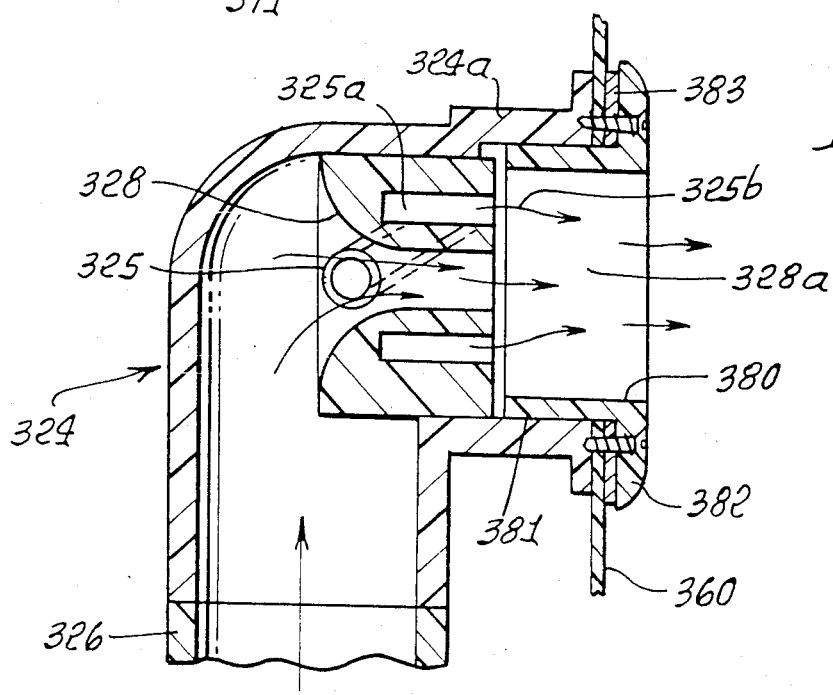

Next, water injection elbow tube duct assemblies, as seen in FIG. 16, are inserted (by pushing them) into ports 306 and 307, so that the plastic elbows 324 are received in the ports, air inlet plastic tubes 325 are received in the passages 320, and flexible plastic ducts 326 are received in the cored passages 311a and 312a (by pushing them radially through the slits 311 and 312) and extending toward port 300. FIG. 16a shows the injection elbow interior construction, with a venturi 328 receiving water from duct 326 and jetting aerated water from the elbow into the tub interior. The venturi receives air from the aeration tube 325 and air flow regulatory means appears at 325d. See jet 328a. Passage 320 and tube 325 extend to upper rim 299c of the tub wall. As seen in FIG. 22, a wall fitting 380 has fit at 381 with box end 324a of the elbow 324, and a flange 382 on the wall fitting clamps an annular seal 383 against the tub jacket 360 to establish a seal. Plenum 328a receives water from the venturi 328, mixed with air supplied by duct 325 to annulus 325a to exit at 325b and mix with the water flow.

Figure 17:
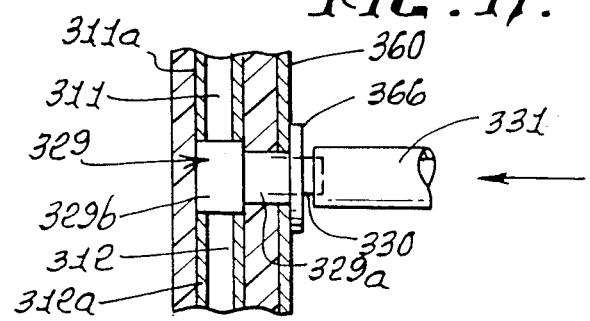
FIG. 17 is a plan view of a T-shaped tubular fitting installed in the wall, for spa drain purposes.
Figure 21:
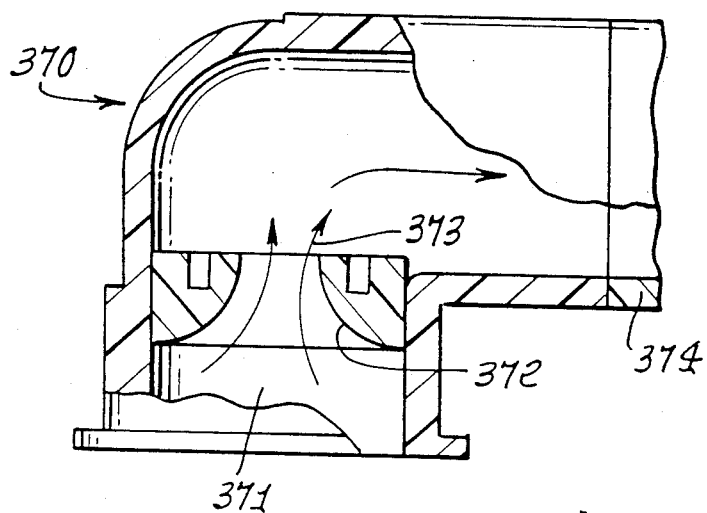

FIG. 17 is a section showing a tee 329 having a stem 329a as fitted into each of the entrance and drain ports 300 and 301. The tubular tee head 329b is in alignment with passages 311 and 312 and connected with ducts 311a and 312a therein; and a similar tee head 329b is in alignment with passages 313 and 314 and connected with ducts 313a and 314a therein. Tubular connection fittings 330 and 331 are connected with stem 329a, and are connectible with external ducting (see duct 331 in FIG. 19). Elbow 370, as seen in FIG. 21, may be inserted at ports 309 and 310. Water flows from the tub into inlets 371 and through a venturi 372. It then turns at 373 and flows to a plastic tube 374 in core 313 or 314. Smooth flow in 374 is then established.

Figure 19:
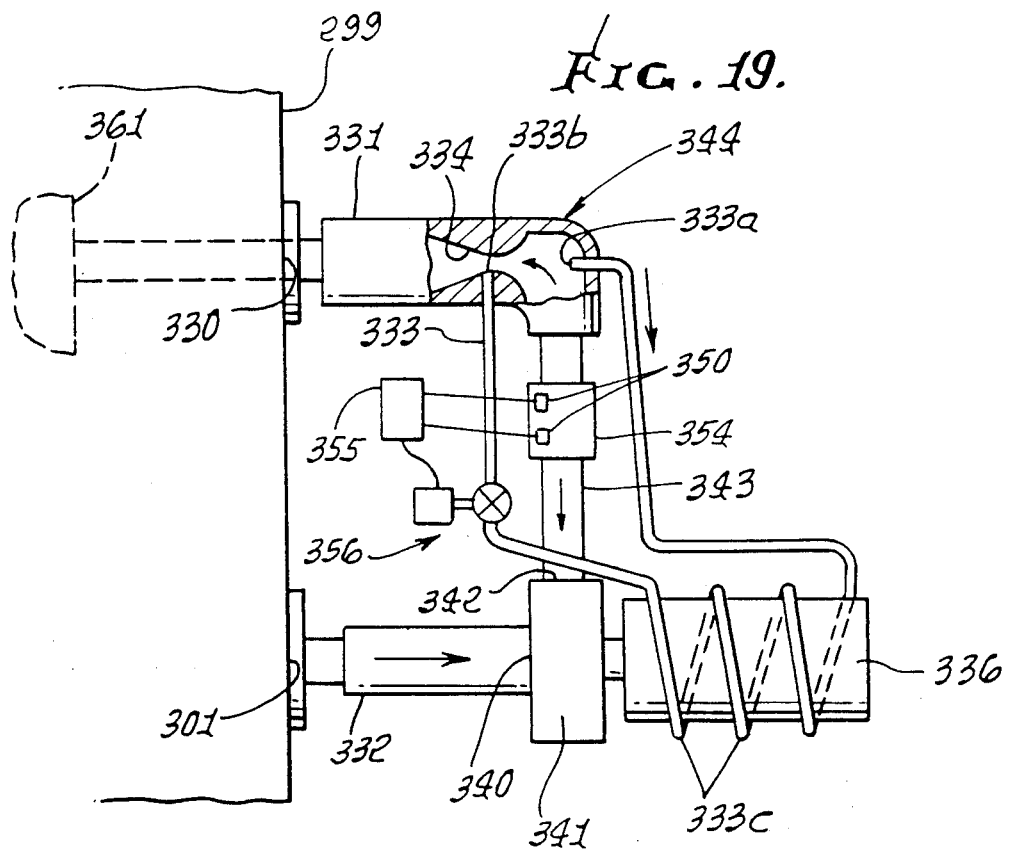
FIG. 19 is a vertical section showing an alternative connections of a pump, to the spa ports.

FIG. 19 shows the by-pass duct 333 that has metallic heat conductive windings 333c about the motor 336 to receive heat therefrom, has its intake at 333a at elbow 323, and its exit or discharge end at 333b, the throat of venturi 334 in duct 331. Therefore, heat from the motor is transferred to the water passing directly to the tub interior via jets at 306 and 307, and the pressure differential between 333a and 333b facilitates flow in the by-pass duct 333. Water draining from the pool at port 301 passes via duct 332 to the intake 340 of centrifugal pump 341 driven by the motor. The pump discharge, at 342, passes via metallic riser duct 343, plastic elbow 344, venturi 334 and plastic duct 331 to tub intake port 330.

Temperature control sensors 350 are applied to the metallic riser duct 343 to sense the temperature of the water flowing to the spa, and those sensors are covered by a plastic foam sheath 354. A control 355 receives input from the sensors, and controls a valve 356 in the by-pass duct, increasing the closing of that valve if the water temperature rises above a pre-set limit, and vice versa. A filter 361 in the spa tub removes particulates from the water recirculated to the tub interior via duct 331.

Figure 19A:
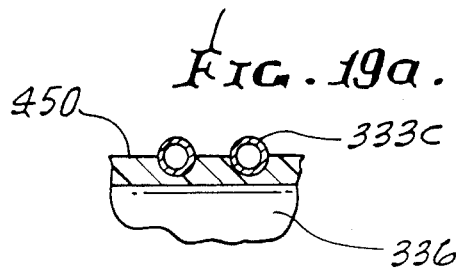
FIG. 19a is an enlarged section showing use of protective plastic.

FIG. 19a shows the use of heat conductive thermal mastic at 450 between the motor and the windings t conduct heat efficiently from the motor to the coil. An example is the product T-70, produced by Thermal Industries, Texas.

Figure 18:
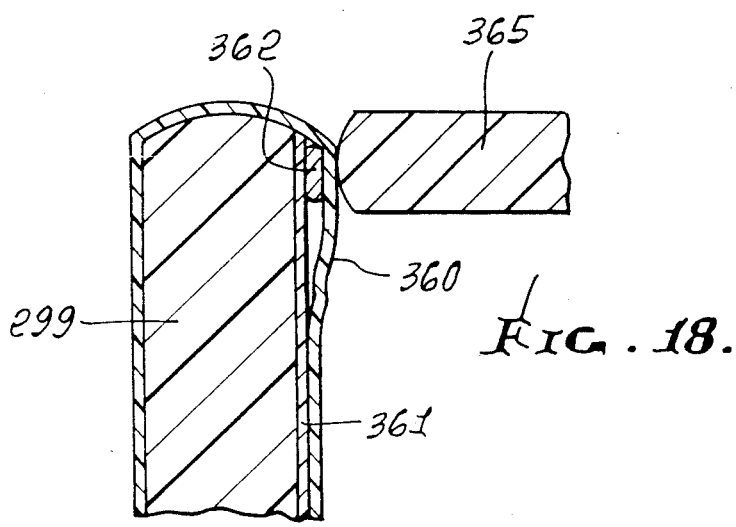
FIG. 18 is a vertical section through a tub wall showing cushioning for top closure sealing.

In FIG. 18, a vinyl jacket 360 fits over the tub wall 299, and over the tensile liner 361 adherent to the inner side of the wall, to seal off the slits 311,312, 313, and 314 referred to. An annular resilient cushion 362 inside the jacket, near the top of the wall provides an interference fit with a tub cover 365, as shown, sealing off the tub interior. The cushion may consist of open cell urethane foam. The elbow and drain fittings have sealing engagement with the jacket, as via clamping flanges 366, seen in FIG. 17. The jacket 360 forms openings in alignment with the ports, as at 306, 307, 309, and 310.

Figure 20:
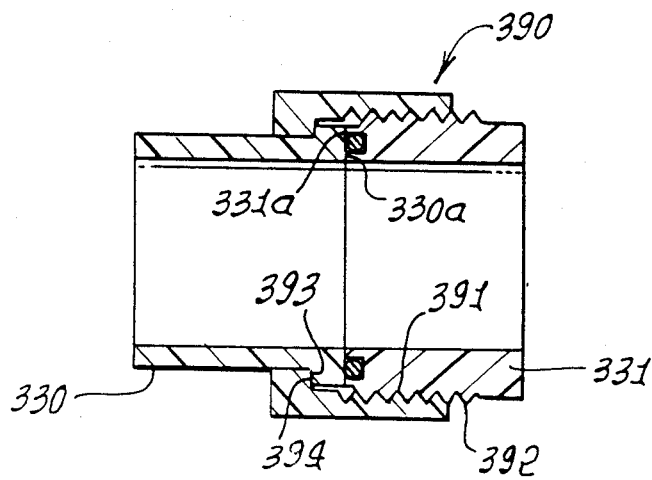
FIGS. 20–22 are sections through the wall fittings.

The fitting seen in FIG. 20 may be employed at the connection between duct 330 and duct 331. These ducts have ends 330a and 331a urged together as annular coupling 390 bridging such ends is rotatably tightened. Coupling 390 has internal threads 391 engaging external threads 392 on duct 331; and it has an internal shoulder at 393 engaging external shoulder 394 on duct 330.

We claim:

1. The method of forming a relatively lightweight plastic tub side wall that passes tub liquid, and employing an elongated sheet formed of foamed thermoplastic material that includes the steps:
   (a) progressively winding said sheet in a spiral fashion about an axis passing through the center of the space to be enclosed by said side wall,
   (b) heat fusing together successive foamed plastic sheet layers to form a unitary group of convolutions,
   (c) providing openings to extend in said wall for passing tub liquid, by locally cutting away said material across multiple of said convolutions, said cutting away step including forming a slit or slits in said wall,
   (d) said cutting away step being carried out to form a tunnel or tunnels in said wall, inwardly of said slit or slits.

2. The method of claim 1 wherein said cutting away step is carried out by heat cutting of the plastic wall material.

3. The method of claim 1 including inserting a duct or ducts into said tunnel or tunnels, to pass said liquid.

4. The method of claim 1 including providing a stretch resistant liner and locating the liner adjacent the side of said wall to resist outward expansion in response to loading exerted by liquid filled into the tub interior, as via openings locally cut in said wall.

5. The method of claim 1 including forming both liquid passing and gas passing passages in said wall convolutions.

6. The method of claim 1 wherein said heat fusing is carried out by heating the surface of the sheet approaching a locus of winding juncture of the sheet with a wound convolution, said heating being such that said heated sheet surface bonds to said wound convolution.

7. The method of claim 1 including rotatably driving said unitary group of convolutions about said axis during said heat fusing.

8. The method of claim 4 including cutting said openings to form ports that extend through said side wall and through the liner for passing liquid between the tub interior and exterior.

9. The method of claim 8 that includes providing said liner to comprise two layers of plastic material that have been bonded together, one layer consisting of foamed plastic.

10. The method of claim 4 including providing a flexible jacket, and closely fitting the jacket to said wall, and forming tub liquid passing openings through said jacket and in said wall.

11. The method of claim 6 including employing a roller to effect local pressurization at said winding juncture of the sheet approaching that locus and the wound convolution.

12. The method of claim 7 including exerting endwise tension on the sheet material being wound on said unitary group of convolutions.

13. The method of forming a relatively lightweight plastic tub side wall that passes tub liquid, and employing an elongated sheet formed of foamed thermoplastic material that includes the steps:
 (a) progressively winding said sheet in a spiral fashion about an axis passing through the center of the space to be enclosed by said side wall,
 (b) heat fusing together successive foamed plastic sheet layers to form a unitary group of convolutions,
 (c) forming both liquid passing and gas passing passages in said wall convolutions,
 (d) a liquid passing passage being formed to have elbow configuration, and a gas passing passage being formed to intersect said elbow configuration.

14. The method of claim 13 including inserting a hard plastic tubular elbow into said elbow-shaped passage, and jetting tub liquid into the tub interior via said hard plastic elbow, and aspirating gas into the jetted liquid via the gas passing passage.

15. The method of claim 14 including inserting a hard plastic duct into said gas passing passage to communicate with the interior of said hard plastic elbow, and passing gas to said hard plastic elbow via said hard plastic duct.

16. The method of claim 15 including extending said gas passing passage to terminate at or proximate an upper rim defined by said wall.

17. The method of forming a relatively lightweight plastic tub side wall that passes tub liquid, and employing an elongated sheet formed of foamed thermoplastic material that includes the steps:
 (a) progressively winding said sheet in a spiral fashion about an axis passing through the center of the space to be enclosed by said side wall,
 (b) heat fusing together successive foamed plastic sheet layers to form a unitary group of convolutions.
 (c) said material being resiliently compressible, as is said wall, and maintaining said sheet to have width approximating the height of said wall, during said winding,
 (d) and attaching an inner unitary liner adjacent the side wall during said winding step, the liner characterized as formed of pre-stretched plastic material that resists outward expansion toward said wall in response to loading exerted by water in the tub interior.

18. The method of claim 17 including providing a flexible jacket, and closely fitting the jacket to said liner, and forming tub liquid passing openings through said jacket, said liner, and in said wall.

19. The method of claim 17 including heat cutting plastic material proximate an upper rim defined by said wall, thereby to form an arcuate upper rim, crosswise of multiple of said convolutions.

20. The method of forming a relatively lightweight plastic tub side wall that passes tub liquid, and employing an elongated sheet formed of foamed thermoplastic material that includes the steps:
 (a) progressively winding said sheet in a spiral fashion about an axis passing through the center of the space to be enclosed by said side wall,
 (b) heat fusing together successive foamed plastic sheet layers to form a unitary group of convolutions,
 (c) providing a stretch resistant liner and locating the liner adjacent the side of said wall to resist outward expansion in response to loading exerted by liquid filled into the tub interior, as via openings locally cut in said wall,
 (d) cutting said openings to form ports that extend through said side wall and through the liner for passing liquid between the tub interior and exterior,
 (d) and including providing a pump and assembling the pump to the tub to pump tub liquid into the tub interior, via at least one of said ports, and providing means for transferring heat from the motor to tub liquid being pumped.

21. The method of claim 20 including transferring motor heat to a by-pass stream of tub liquid circulating about the motor, and aspirating said by-pass stream into the liquid being pumped to the tub interior.

22. The method of forming a relatively lightweight plastic tub side wall that passes tub liquid, and employing an elongated sheet formed of foamed thermoplastic material that includes the steps:
 (a) progressively winding said sheet in a spiral fashion about an axis passing through the center of the space to be enclosed by said side wall,
 (b) heat fusing together successive foamed plastic sheet layers to form a unitary group of convolutions,
 (c) said material being resiliently compressible, as is said wall,
 (d) providing a flexible jacket, and closely fitting the jacket to said wall, and forming tub liquid passing openings through said jacket and in said wall,
 (e) and providing a resiliently compressible cushion against the jacket, and at the inner side of the wall, and fitting a tub cover into the uppermost interior of the tub, to compressively interfere with said cushion.

* * * * *